United States Patent
Arthur

(10) Patent No.: US 6,190,096 B1
(45) Date of Patent: *Feb. 20, 2001

(54) INDEXABLE CUTTING INSERT WITH INDEXING MARKS

(75) Inventor: Scott H. Arthur, Burlington, NC (US)

(73) Assignee: Kennametal Inc., Latrobe, PA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/693,733

(22) Filed: Aug. 7, 1996

(51) Int. Cl.⁷ ..................................................... B23B 27/08

(52) U.S. Cl. ............................... 407/113; 407/73; 407/74

(58) Field of Search ................................ 407/103, 107, 407/102, 118, 119, 36, 39, 64, 78, 79, 80, 77, 113, 73, 74, 75

(56) References Cited

U.S. PATENT DOCUMENTS

| | | | |
|---|---|---|---|
| 3,383,748 | 5/1968 | Galimberti et al. | 29/95 |
| 3,597,104 | * 8/1971 | Salcumbe | 407/103 X |
| 3,885,282 | 5/1975 | Pataky | 29/98 |
| 4,030,072 | 6/1977 | Bjornsson | 340/172.5 |
| 4,273,479 | 6/1981 | Raupp, Jr. et al. | 407/113 |
| 4,294,565 | 10/1981 | Erkfritz | 407/113 |
| 4,311,418 | 1/1982 | Erkfritz et al. | 407/39 |
| 4,378,184 | * 3/1983 | Briese | 407/103 X |
| 4,389,144 | * 6/1983 | Sipos | 407/82 |
| 4,470,732 | * 9/1984 | Lindsay | 407/104 |
| 4,631,994 | 12/1986 | Jester et al. | |
| 4,632,593 | 12/1986 | Stashko | 403/316 |
| 4,682,916 | * 7/1987 | Briese | 407/103 X |
| 4,812,087 | 3/1989 | Stashko | 407/43 |
| 4,900,700 | 2/1990 | Jun et al. | 501/78 |
| 4,984,940 | 1/1991 | Bryant et al. | 407/119 |
| 5,076,738 | 12/1991 | Pano et al. | 407/110 |
| 5,144,773 | 9/1992 | Flores et al. | 51/165.74 |
| 5,145,295 | 9/1992 | Satran | 407/113 |
| 5,176,053 | 1/1993 | Alvelid et al. | 82/173 |
| 5,188,489 | 2/1993 | Santhanam et al. | 407/119 |
| 5,238,334 | 8/1993 | Brandt et al. | 407/116 |
| 5,248,386 | 9/1993 | Dastolfo, Jr. et al. | 156/659.1 |
| 5,336,026 | 8/1994 | Noggle | 408/147 |
| 5,346,336 | 9/1994 | Reseigno | 407/104 |
| 5,370,717 | * 12/1994 | Lloyd et al. | 51/293 |
| 5,399,237 | 3/1995 | Keswick et al. | 156/643 |
| 5,432,132 | 7/1995 | Dasgupta et al. | 501/97 |
| 5,442,981 | 8/1995 | Vegh | 82/1.11 |
| 5,478,175 | * 12/1995 | Kraemer | 407/64 X |
| 5,503,913 | 4/1996 | Konig et al. | 428/216 |
| 5,525,016 | * 6/1996 | Paya et al. | 407/116 |

FOREIGN PATENT DOCUMENTS

| | | | |
|---|---|---|---|
| 3540665 | 5/1987 | (DE) . | |
| 0582484 | 9/1994 | (EP) . | |
| 2271894 | 12/1975 | (FR) . | |
| 2037629 | * 7/1980 | (GB) | 407/103 |
| 59-8679A | 1/1984 | (JP) . | |
| 0963701 | * 10/1982 | (SU) | 407/107 |

OTHER PUBLICATIONS

International Search Report mailed Aug. 11, 1997 in counterpart PCT Application No. PCT/US97/07336.

* cited by examiner

Primary Examiner—Henry Tsai
(74) Attorney, Agent, or Firm—Larry R. Meenan

(57) ABSTRACT

An indexable cutting insert which presents a rake face and a flank face which intersect to form a generally circular cutting edge. At least one of the flank face and the rake face has a visually perceivable indicia thereon so as to indicate a plurality of discrete indexable positions of the cutting insert.

26 Claims, 5 Drawing Sheets

INDEXABLE CUTTING INSERT WITH INDEXING MARKS

BACKGROUND

The invention pertains to an indexable cutting insert which presents visually perceivable indicia thereon which enables the operator to index the cutting insert to a predetermined position thereby optimizing the use of the cutting insert.

Indexable cutting inserts of a generally cylindrical or frustoconical shape, i.e., so-called round cutting inserts (see American National Standard ANSI B212.4—1986), have many uses in material removal operations (e.g., machining). Because the cutting insert is of a generally cylindrical or frustoconical shape, it is difficult for the operator to ascertain exactly how far to rotate the cutting insert to index the same so as to present a completely unused cutting edge and still optimize the overall useful life of the cutting insert.

It is undesirable for a cutting insert to present a cutting edge that has a used portion. In order to make certain that the cutting insert presents an unused cutting edge, the operator typically indexes a round cutting insert more than the optimum extent because the operator wants to make certain that the cutting insert presents an unused cutting edge. However, when the operator indexes the cutting insert in such a fashion so as to avoid presenting a used cutting edge, it is typical that a certain portion or portions of the cutting edge will remain unused. Subsequent to the complete indexing of the cutting insert, it is impossible to use these unused portions of the cutting edge.

In many cases, indexable round cutting inserts are expensive in that they have an expensive substrate or use a hard coating of expensive material such as, for example, cubic boron nitride, polycrystalline diamond, diamond sheet, and the like. Because of the expense of the cutting insert, it would be desirable to provide a way by which the operator can index the cutting insert to as many indexable positions as practically possible while always presenting an unused cutting edge.

SUMMARY

The invention is an indexable cutting insert which comprises a round cutting insert body. The cutting insert body presents a rake face which presents a generally circular shape and a flank face. The rake face and the flank face intersect to form a generally circular cutting edge. At least one of the rake face and the flank face have a visually perceivable indicia thereon so as to indicate a plurality of discrete indexable positions of the cutting insert relative to a toolholder. The flank face may be of a generally cylindrical or generally conical shape.

BRIEF DESCRIPTION OF THE DRAWINGS

The following is a brief description of the drawings of the present patent application.

DETAILED DESCRIPTION

Figure 1:
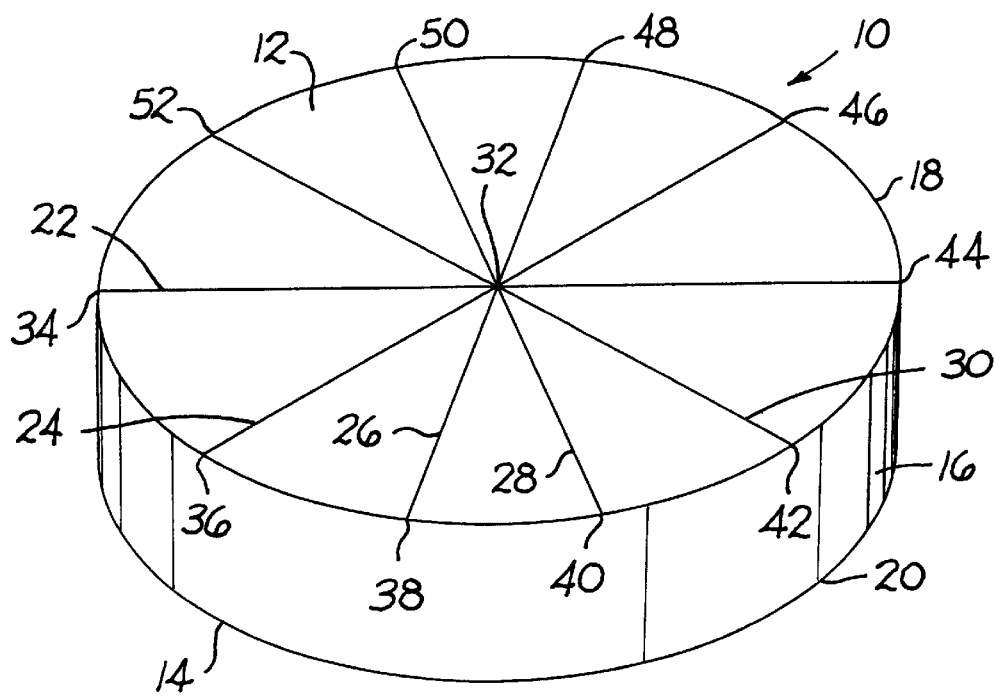
FIG. 1 is a isometric view of a specific embodiment of the cutting insert of the invention.

Referring to the drawings, a specific embodiment of the cutting insert is generally designated as 10. Cutting insert 10 is of a generally cylindrical shape with a generally circular top rake face 12, a generally circular bottom rake face 14 and a generally circular flank face 16. The top rake face 12 intersects with the flank face 16 to from a top cutting edge 18. The bottom rake face 14 intersects with the flank face 16 to form a bottom cutting edge 20. Top and bottom cutting edges 18 and 20 may include a T-land (e.g., 0.008 inch×20 degree T-land) and/or be honed (e.g., a 0.001 to 0.002 inch radius hone).

Cutting insert 10 is typically a coated cutting insert so that it has an outer coating. The coating may includes any one of a number of hard materials, or a combination thereof. For example, the cutting insert 10 may have a coating of cubic boron nitride, polycrystalline diamond, polycrystalline cubic boron nitride layer, diamond layer, diamond like carbon, titanium aluminum nitride, titanium carbide, titanium carbonitride, titanium nitride, and/or alumina. These coatings may be applied by physical vapor deposition (PVD) techniques and/or chemical vapor deposition (CVD) techniques, or in the case of a polycrystalline diamond or polycrystalline cubic boron nitride coating it may be brazed or otherwise bonded to the substrate.

It should be appreciated that the present invention also has application to uncoated cutting inserts. Specific substrates and uncoated cutting inserts contemplated by applicant include tungsten carbide-based cemented carbides, Ti(C,N)-based cermets, polycrystalline cubic boron nitrides (either of the ceramic type or the cermet type), and ceramics such as alumina, silicon nitride, and SiAlON-based (i.e., more than 50 volume percent) materials either with or without a ceramic particulate or whisker (e.g., zirconia, tungsten carbide, titanium carbide, titanium carbonitride and/or titanium nitride) reinforcement phase dispersed therein.

As illustrated in FIG. 1, the top rake face 12 includes five diametrical lines (22, 24, 26, 28, 30) wherein each line passes through the geometrical center 32 of the top rake face 12. These diametrical lines (22, 24, 26, 28, 30) intersect the cutting edge 18 so as to create ten separate and distinct intersection points (34, 36, 38, 40, 42, 44, 46, 48, 50, 52).

The diametrical lines must be visually perceivable by the operator in order for the operator to effectively index the cutting insert. These diametrical lines can be formed on the surface of the top rake face 12 by etching or any other means by which the lines are visually perceivable to the operator and permanent for the useful life of the cutting insert. For example, a coating may be applied on the surface to create the visually perceivable indicia, e.g., diametrical lines. In addition to, or in place of, diametrical lines applicant contemplates the use of a series of dots, dashes, broken lines or any other visually perceivable mark that can function as the visually perceivable indicia which indicates the position to which the cutting insert should be indexed.

Figure 2:
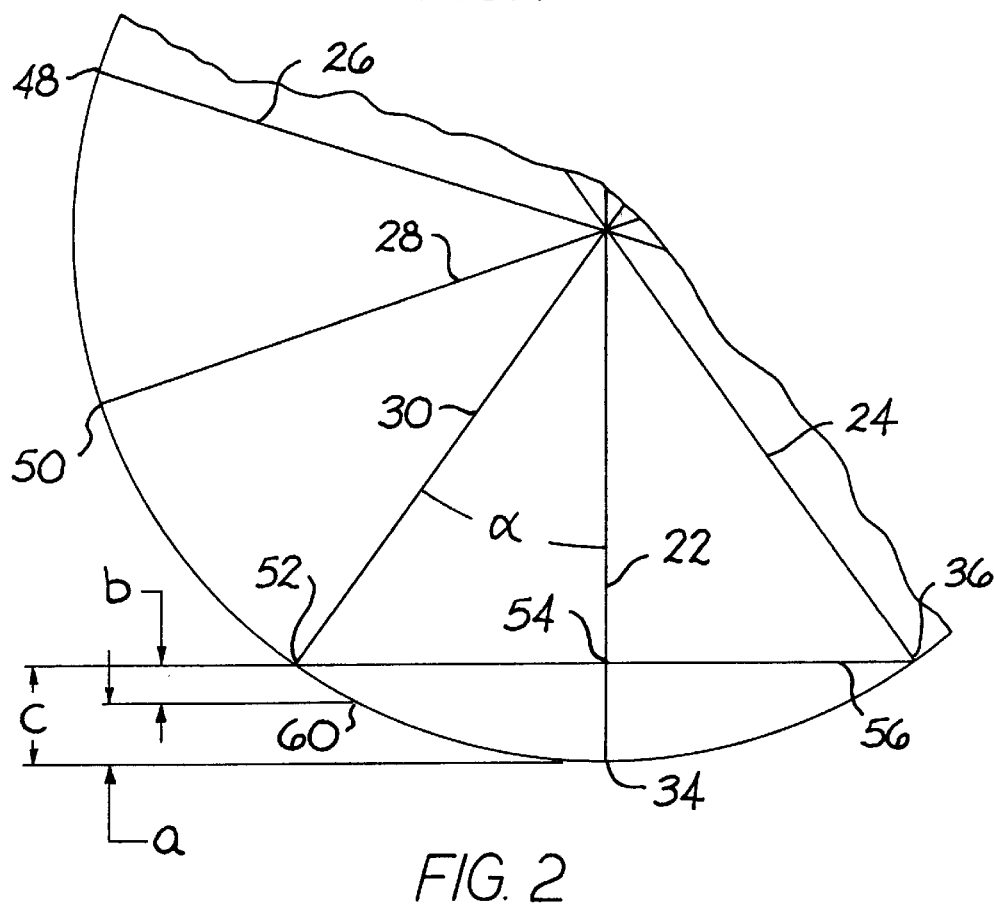
FIG. 2 is a top view of the cutting insert of FIG. 1 with a portion of the cutting insert broken away and enlarged.

Referring to FIG. 2, each intersection point has an arcuate portion of the cutting edge 18 adjacent thereto. For the sake of clarity, the following description focuses only on intersection point 34. Yet, it should be understood that the description applies to each one of the intersection points (34, 36, 38, 40, 42, 44, 46, 48, 50, 52).

It is important to locate the diametrical lines for optimum usage of the cutting insert. In other words, there should be as many indexable positions as possible without compromising the ability to present a completely unused cutting edge at each indexable position. As a consequence, the position of each intersection point (or the included angle α between adjacent diametrical lines) preferably corresponds to the recommended depth of cut of the cutting insert, as well as take into account the depth of a safety margin.

Still referring to FIG. 2, if the depth of cut is to be a distance "a" and the specific application has a safety factor depth equal to distance "b", then the total distance to factor into the positioning of the diametrical lines is "c" (which equals the sum of the distances "a" and "b"). The distance "c" is the distance between the intersection point 34 and the chordal point 54 on diametrical line 22. Chordal point 54 is the point at which line 22 is intersected by a chord 56 that is perpendicular to diametrical line 22. The chord 56 intersects the cutting edge 18 at two points which represent the intersection points (36 and 52) for the two adjacent diametrical lines (24 and 30, respectively). During the cutting of the workpiece, the portion of the cutting edge 18 to the left of the intersection point 34 and to the right of intersection point 52 (see FIG. 2) engages the workpiece material. To achieve a depth of cut equal to the distance "a", the cutting edge between point 34 and the point 60 becomes worn. There is a portion of the cutting edge between point 60 and point 52 that typically is not worn and provides a safety margin before the portion of the cutting edge 18 to the left (in FIG. 2) of point 52 would engage the workpiece.

By spacing the lines in the above fashion there is provided sufficient distance to accommodate the depth of cut (and a safety margin) and still present an unused cutting edge at each indexable position of the cutting insert. The spacing of the lines may be done so as to satisfy the following two relationships:

$$\sec \alpha = r/(r-c); \text{ and}$$

$$(n)(\alpha) = 360° \text{ where } n \text{ is a whole integer (e.g., 2, 3, 4, etc.)}$$

FIG. 2 depicts the included angle "α", "r" is the radius of the circular rake face of the cutting insert, and "c" is the sum of the depth of cut "a" and the safety factor "b".

One specific example of a generally cylindrical cutting insert which included the visually perceivable indicia was a Kennametal KD200 polycrystalline cubic boron nitride (RNM42) cutting insert. The cutting insert was normally black; however, for the purpose of providing the visually perceivable indicia the surface of the cutting insert was PVD coated with titanium nitride so as to present a gold colored surface. The visually perceivable indicia in the form of five diametrical lines were laser etched on the gold colored surface so as to form grey lines which were visually perceivable against the gold background. Although this example used laser etching to create the visually perceivable indicia other methods are acceptable. These methods include, in addition to laser etching, mechanical scratching, chemical etching, painting, and coating.

Figure 3:
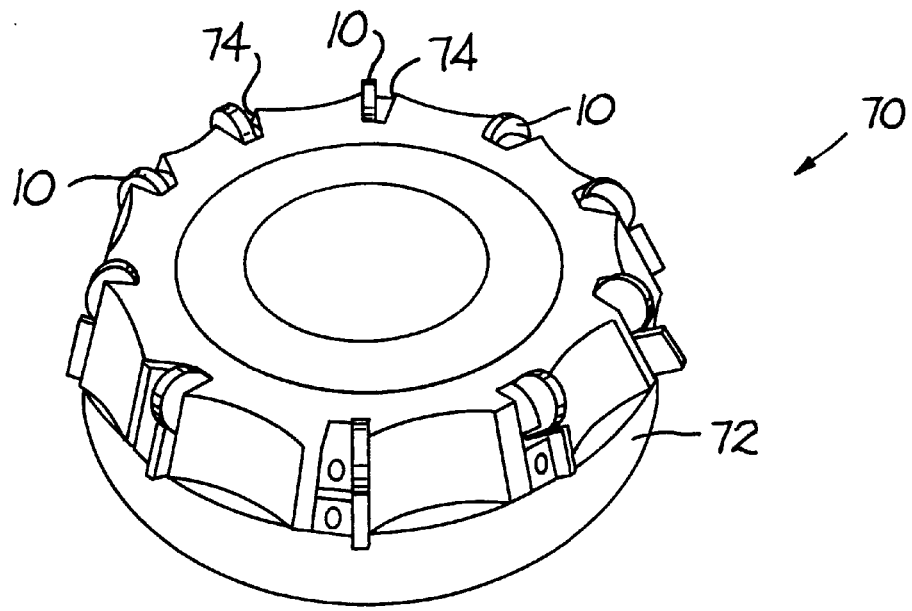
FIG. 3 is an isometric view of the cutting insert of FIG. 1 retained in a milling cutter.
Figure 4:
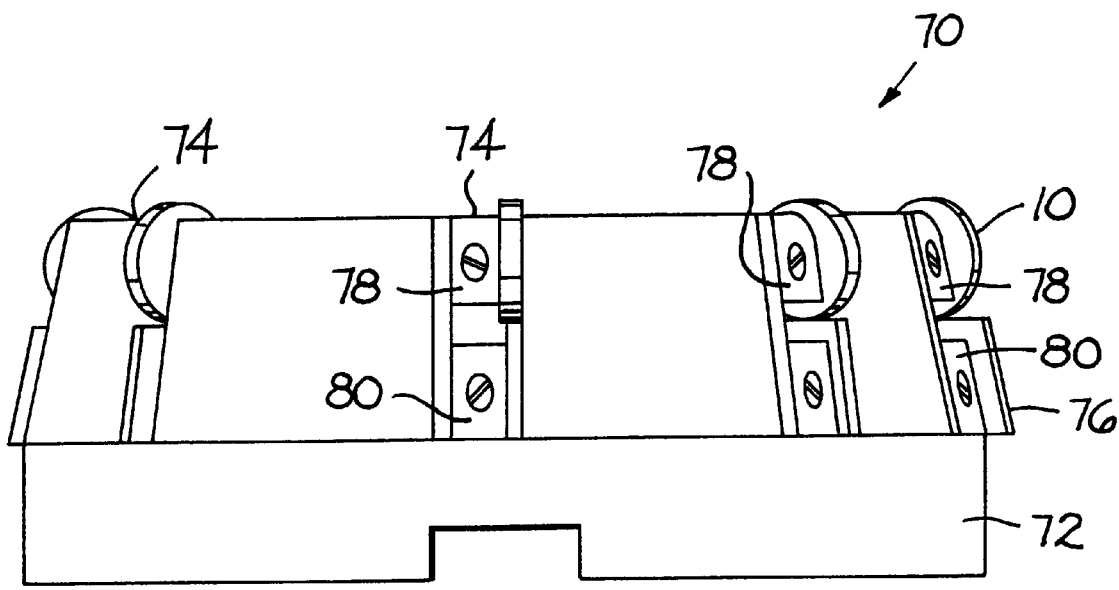
FIG. 4 is a side view of the cutting insert-milling cutter arrangement of FIG. 3.

Referring to FIGS. 3 and 4, there is illustrated a milling cutter, generally designated as 70. Milling cutter 70 has generally circular cutter body 72 that contains a plurality of pockets 74 at the circumference thereof. Each pocket 74 receives a cutting insert 10, as well as a shim 76. The cutting insert 10 and the shim 76 are each secured into the pocket 74 by locking members (or wedges) 78 and 80, respectively. Each cutting insert 10 is firmly secured in its corresponding pocket 74.

The specific milling cutter may vary depending upon the particular application. Typically, milling cutters include KENDEX face mills which present pockets that accept a cutting insert. KENDEX is a trademark of Kennametal Inc., of Latrobe, Pa.

Figure 5:
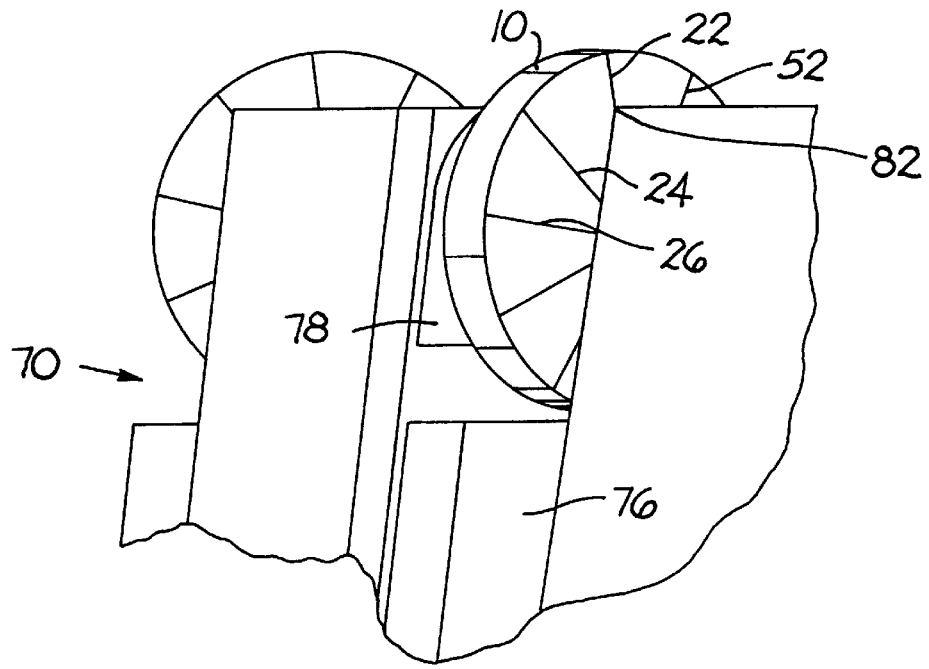
FIG. 5 is an enlarged side view of a portion of the cutting insert-milling cutter arrangement of FIG. 4 wherein the cutting insert is shown in a first indexable position.
Figure 6:
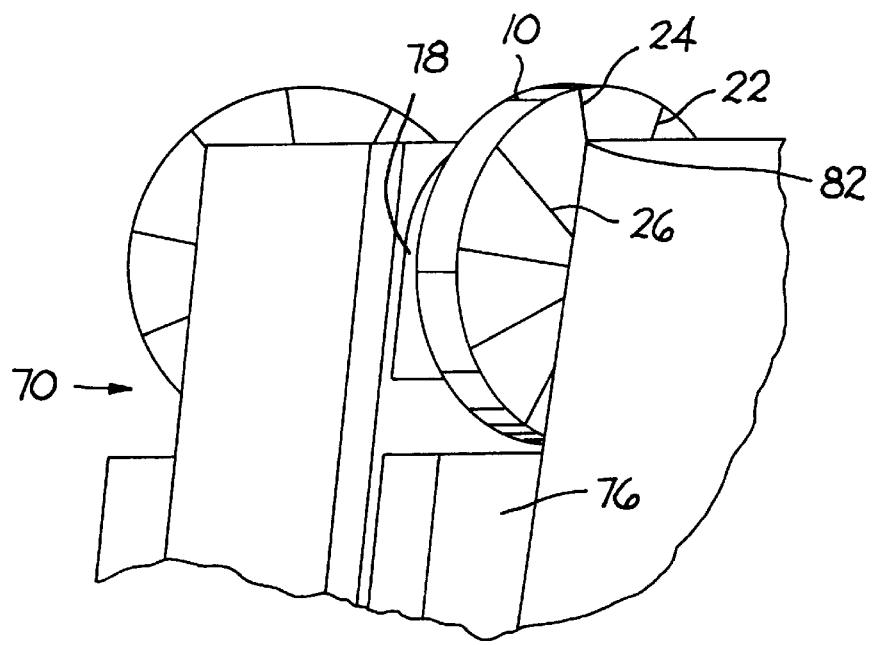
FIG. 6 is an enlarged side view of a portion of the cutting insert-milling cutter arrangement of FIG. 4 wherein the cutting insert is shown in a second indexable position.

Referring to FIGS. 5 and 6, the cutting insert 10 presents a plurality of diametrical lines, i.e., visually perceivable indicia. For the sake of clarity, FIG. 5 depicts the references numerals 22, 24 and 26 for adjacent diametrical lines. The pocket 74 includes an upper edge 82. Upper edge 82 is a reference point to which the operator can index the cutting insert 10. It should be appreciated that a visually perceivable indicia could be placed at another location on the cutter body to function as the reference point.

As depicted in FIG. 5, the upper edge 82 is aligned with diametrical line 22 and is in a so-called first indexable position. Once the useful life of the cutting insert 10 is over in this position, the operator can index the cutting insert 10 to a so-called second indexable position so that the diametrical line 24 is aligned with the upper edge 82. The second indexable position of the cutting insert 10 is illustrated in FIG. 6.

Figure 7:
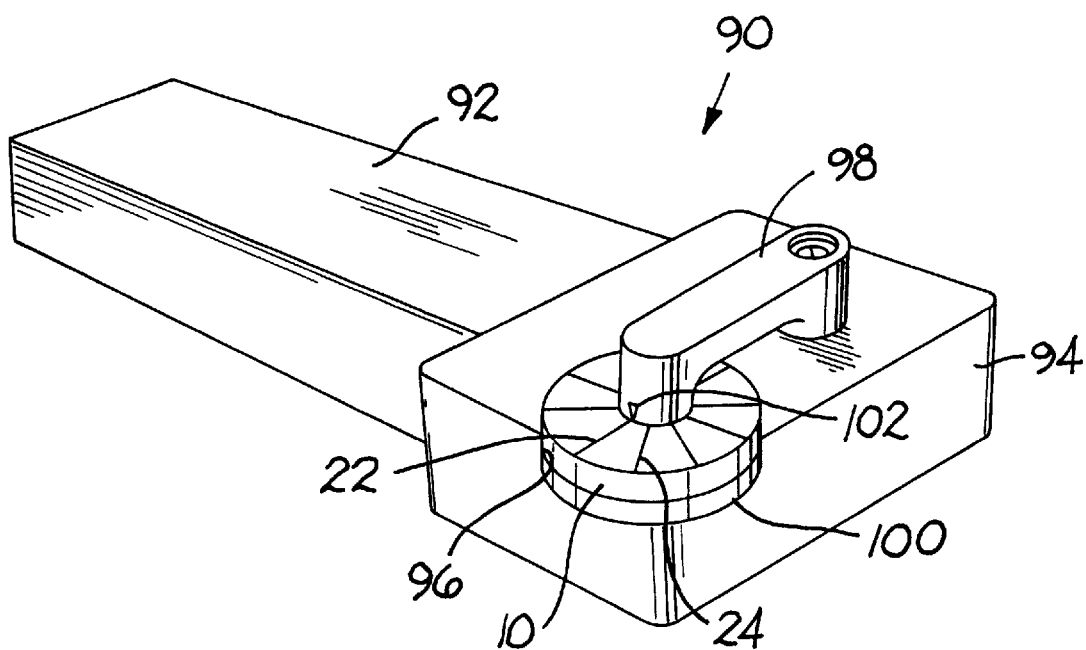
FIG. 7 is an isometric view of a cutting insert retainer in an elongate toolholder wherein the cutting insert is shown in a first indexable position.
Figure 8:
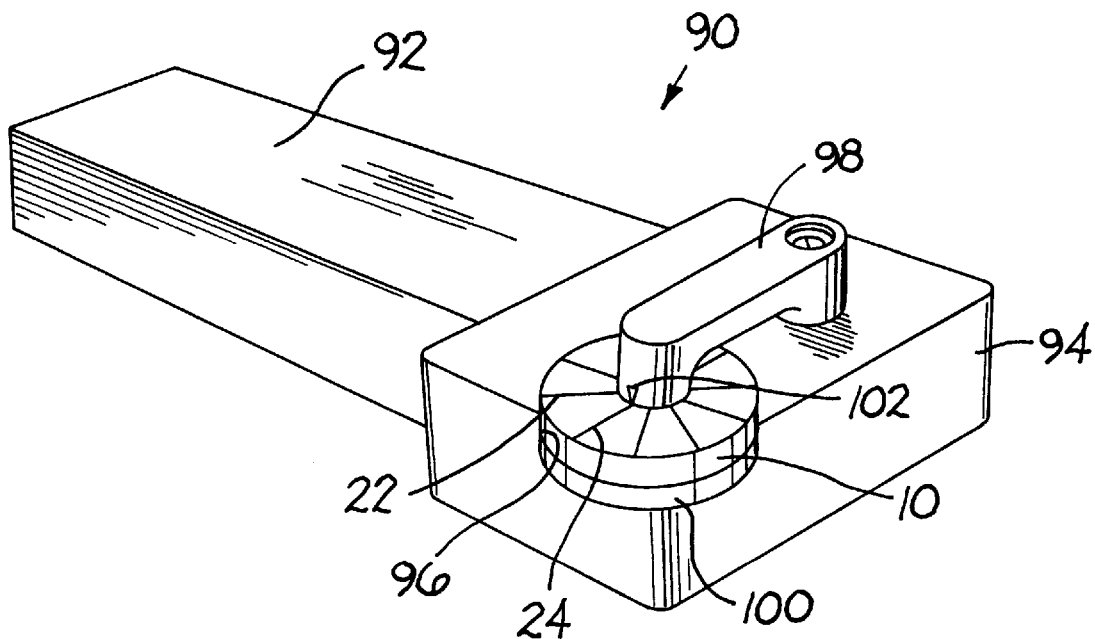
FIG. 8 is an isometric view of a cutting insert retainer in an elongate toolholder wherein the cutting insert is shown in a second indexable position.

Referring to FIGS. 7 and 8, these drawings illustrate another style of toolholder, generally designated as 90, along with the cutting insert 10 which may be used for turning a workpiece. Typical toolholders of this general style include KENDEX toolholders wherein KENDEX is a trademark of Kennametal Inc., of Latrobe, Pa.

Toolholder 90 has an elongate tool body with a shank 92 and an enlarged head 94. The enlarged head contains a pocket 96. A clamp 98 is attached to the enlarged head 94. The clamp 98 engages the top rake surface of the cutting insert 10 so as to retain the cutting insert 10 in the pocket 96 of the toolholder 90. There is a shim 100 beneath the bottom surface of the cutting insert 10 so that the shim 100 is sandwiched between the cutting insert and the bottom surface of the pocket. The clamp 98 presents an indicia 102 which the operator can use to align the with a selected diametrical line so as to position the cutting insert in its proper indexing position.

Referring to FIG. 7., the cutting insert 10 is positioned in a first indexable position so that the indicia 102 is aligned with diametrical line 22. Once the useful life of the cutting insert 10 is over in this position, the operator can index the cutting insert 10 to a second indexable position so that the diametrical line 24 is aligned with the indicia 102. The second indexable position of the cutting insert 10 is illustrated in FIG. 8.

Figure 9:
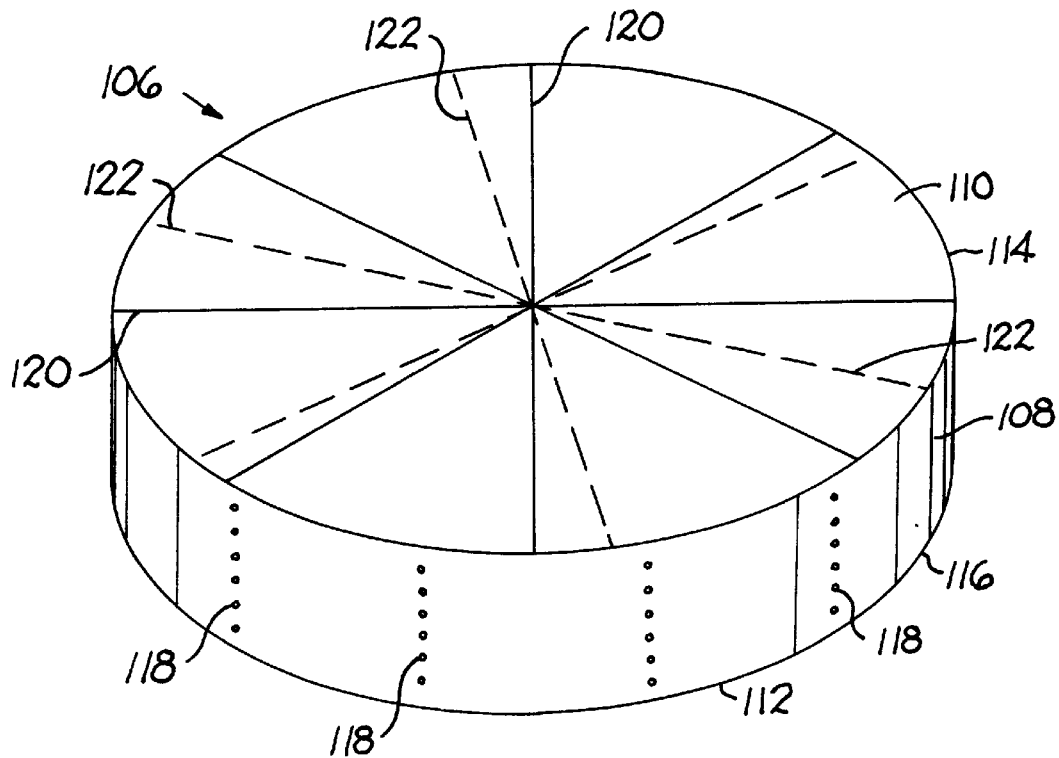
FIG. 9 is an isometric view of another specific embodiment of the cutting insert of the invention.

Referring to FIG. 9, a cutting insert 106 includes a generally cylindrical flank face 108, a generally round top rake face 110, and a generally round bottom rake face 112. The top and bottom rake faces (110, 112) intersect with the flank face 108 to form a top cutting edge 114 and a bottom cutting edge 116, respectively.

The flank face 108 presents a visually perceivable indicia thereon in the form of a plurality of equi-spaced dotted lines 118. Dotted lines 118 have a spacing so as to provide for ten discrete indexable positions of the cutting insert. The top rake face 110 presents two different sets of visually perceivable indicia. One set comprises a plurality of solid diametrical lines 120 wherein the spacing and number of diametrical lines 120 provides for eight discrete indexable positions of the cutting insert. The second set comprises a plurality of dashed lines 122 wherein the spacing a number of dashed lines 122 provides for six discrete indexable positions.

Each set of visually perceivable indicia, i.e., dotted lines 118, solid lines 120, or dashed lines 122, corresponds to a different depth of cut and safety margin. Like with cutting insert 10, the operator uses the visually perceivable indicia to position the cutting insert 106 to a selected indexable position. However, the operator must also select the set of visually perceivable indicia to use so as to correspond with the particular application. By providing a plurality of sets of visually perceivable indicia on a single cutting insert, applicant provides a way to permit a single cutting insert to present an optimum number of indexable positions for a plurality of specific material removal applications.

Figure 10:
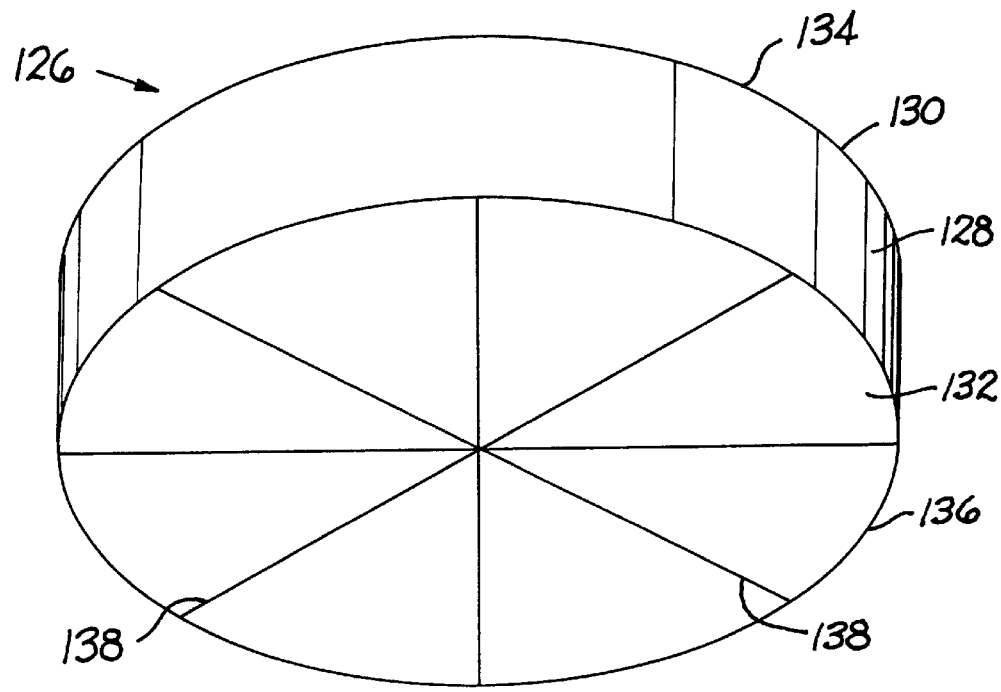
FIG. 10 is an isometric view of still another specific embodiment of the cutting insert of the invention.

Referring to FIG. 10, cutting insert 126 has a flank face 128, a top rake face 130, and a bottom rake face 132. The top and bottom rake faces intersect with the flank face to form a top cutting edge 134 and a bottom cutting edge 136. The bottom rake face 132 presents visually perceivable indicia in the form of four diametrical lines 138 which provide for eight discrete indexable positions of the cutting insert. The operator uses the diametrical lines 138 on cutting insert 126 like he or she does the lines on cutting insert 10. By providing a visually perceivable indicia on the bottom rake face, it is apparent that the invention is useful both with one-sided cutting inserts and two-sided cutting inserts.

Applicant provides a cutting insert with visually perceivable indicia thereon which enables the operator to index the cutting insert to a predetermined position thereby optimizing the use of the cutting insert. By providing the indicia on the top rake face, the bottom rake face and/or the flank face, as well as providing a plurality of indicia on one cutting insert, applicant permits a single cutting insert (one-sided or two-sided) to be applicable to a number of different material removal applications while still providing an optimum useful life.

Other embodiments of the invention will be apparent to those skilled in the art from a consideration of the specification or practice of the invention disclosed herein. It is intended that the specification and examples be considered as illustrative only, with the true scope and spirit of the invention being indicated by the following claims.

What is claimed is:

1. An indexable cutting insert for use in combination with a toolholder, the cutting insert comprising:

a cutting insert body having a rake face of a circular shape and a flank face of a continuous arcuate shape wherein the rake face and the flank face intersect to form a cutting edge; and at least one of the flank face and the rake face having a visually perceivable indicia thereon extending along a diametrical line or substantially in parallel with a central longitudinal axis of the cutting insert so as to indicate a plurality of discrete indexable cutting positions of the cutting insert relative to the toolholder;

wherein the indicia comprises a plurality of marks, each pair of adjacent marks is disposed at an included angle, the magnitude of the included angle satisfying the following relationships:

$$\sec \alpha = r/(r-c), \text{ and}$$

$$(n)(\alpha) = 360°$$

wherein

α is the included angle, r is a radius of the circular rake face, c is a distance along a diametrical line between an intersection point and a chordal point, wherein the diametrical line is defined by a radial line extending from a point at a geometrical center of the top rake face to a point at the cutting edge, wherein the intersection point is a point defined by the intersection of the diametrical line and the cutting edge and the chordal point is a point defined by the intersection of the diametrical line and a chord, the chord being perpendicular to the diametrical line and including points defined by the intersection of the cutting edge and two adjacent diametrical lines located on opposite sides of the diametrical line, and n is a whole integer.

2. The indexable cutting insert of claim 1 wherein the indicia comprises a plurality of marks that are generally oriented with respect to the geometric center of the rake face.

3. The indexable cutting insert of claim 1 wherein the indicia comprises a plurality of marks wherein each one of the marks is generally oriented with respect to the geometric center of the rake face.

4. The indexable cutting insert of claim 3 wherein each pair of adjacent marks is disposed at a same included angle with respect to all other pairs of adjacent marks.

5. The indexable cutting insert of claim 4 wherein the magnitude of the included angle corresponds to a specific material removal application.

6. The indexable cutting insert of claim 1 wherein the rake face has the visually perceivable indicia thereon, and the flank face has the visually perceivable indicia thereon.

7. The indexable cutting insert of claim 1 wherein the flank face has the visually perceivable indicia thereon.

8. The indexable cutting insert of claim 1 wherein the rake face is a top rake face and further including a bottom rake face, the top rake face and the bottom rake face intersect with the flank face to form a top cutting edge and a bottom cutting edge, respectively.

9. The indexable cutting insert of claim 8 wherein the top and bottom rake face each having the visually perceivable indicia thereon.

10. The indexable cutting insert of claim 8 wherein the bottom rake face has the visually perceivable indicia thereon.

11. The indexable cutting insert of claim 8 wherein the top rake face has the visually perceivable indicia thereon, the flank face has the visually perceivable indicia thereon, and the bottom rake face has the visually perceivable indicia thereon.

12. The indexable cutting insert of claim 8 wherein the top cutting edge and the bottom cutting edge are each of a circular shape, and wherein at least two of the top rake face, the bottom rake face, and the flank face have the visually perceivable indicia thereon.

13. The indexable cutting insert of claim 12 wherein the visually perceivable indicia comprises a plurality of marks wherein each one of the marks is generally oriented with respect to a circumference of at least one of the top cutting edge and the bottom edge.

14. The indexable cutting insert of claim 13 wherein the orientation of the indicia on one of the top rake face, the bottom rake face, and the flank face is different from the indicia on another one of the top rake face, the bottom rake face, and the flank face.

15. The indexable cutting insert of claim 1 wherein at least one of the rake face and the flank face has a plurality of sets of visually perceivable indicia thereon.

16. An indexable cutting insert for use in combination with a toolholder, the cutting insert comprising:
   a cutting insert body having a rake face of a circular shape and a flank face of a continuous arcuate shape wherein the rake face and the flank face intersect to form a cutting edge; and
   the flank face having a visually perceivable indicia thereon so as to indicate a plurality of discrete indexable cutting positions of the cutting insert relative to the toolholder.

17. The indexable cutting insert of claim 16 wherein the indicia comprises a plurality of marks that are generally oriented with respect to the geometric center of the rake face.

18. The indexable cutting insert of claim 16 wherein the indicia comprises a plurality of marks wherein each one of the marks is generally oriented with respect to the geometric center of the rake face.

19. The indexable cutting insert of claim 18 wherein each pair of adjacent marks is disposed at a same included angle with respect to all other pair of adjacent marks.

20. The indexable cutting insert of claim 16 wherein the rake face has the visually perceivable indicia thereon.

21. The indexable cutting insert of claim 16 wherein the rake face is a top rake face and further including a bottom rake face, the top rake face and the bottom rake face intersect with the flank face to form a top cutting edge and a bottom cutting edge, respectively.

22. The indexable cutting insert of claim 21 wherein the bottom rake face has the visually perceivable indicia thereon.

23. The indexable cutting insert of claim 21 wherein the top and bottom rake face each have visually perceivable indicia thereon.

24. The indexable cutting insert of claim 21 wherein the top cutting edge and the bottom cutting edge are each of a circular shape, and wherein at least one of the top rake face, and the bottom rake face has the visually perceivable indicia thereon.

25. The indexable cutting insert of claim 24 wherein the visually perceivable indicia comprises a plurality of marks wherein each one of the marks is generally oriented with respect to a circumference of at least one of the top cutting edge and the bottom edge.

26. The indexable cutting insert of claim 25 wherein the orientation of the indicia on one of the top rake face, the bottom rake face, and the flank face is different from the indicia on another one of the top rake face, the bottom rake face, and the flank face.

* * * * *